Oct. 13, 1936.   O. W. DUKES   2,057,373
PORTABLE OVEN
Filed Dec. 19, 1934   2 Sheets-Sheet 1
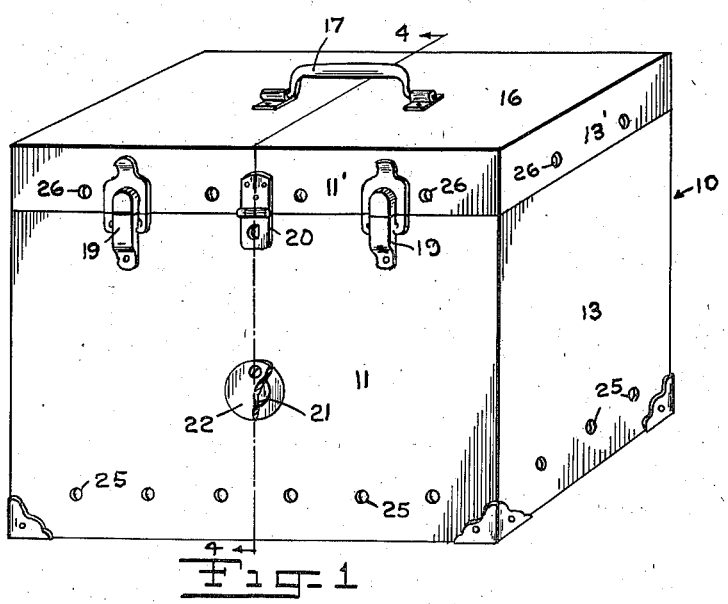
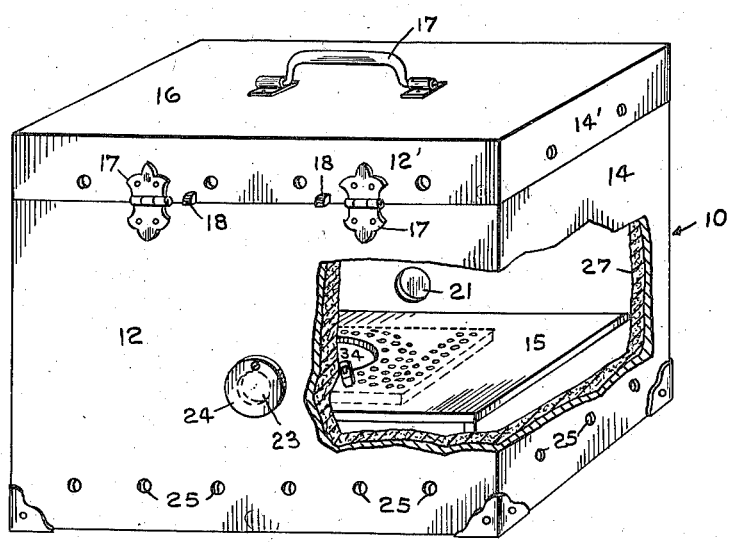
INVENTOR.
Oscar W. Dukes.
BY Arthur H. Serrell
his ATTORNEY.

Oct. 13, 1936.  O. W. DUKES  2,057,373
PORTABLE OVEN
Filed Dec. 19, 1934  2 Sheets-Sheet 2
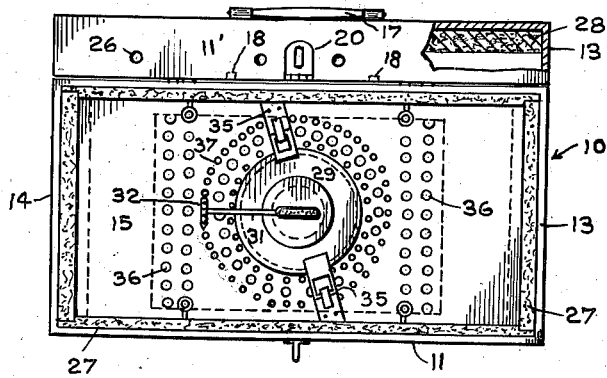
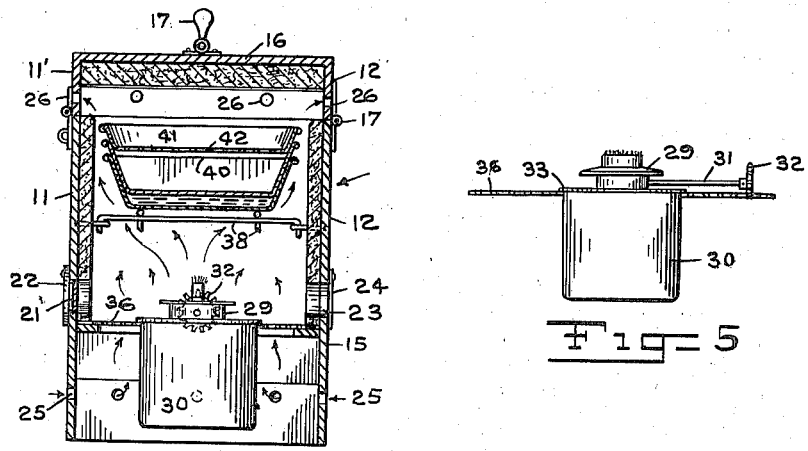
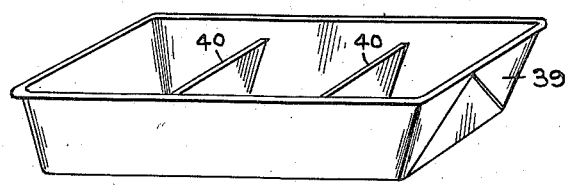
INVENTOR.
Oscar W. Dukes
BY Arthur H. Serrell
his ATTORNEY.

Patented Oct. 13, 1936

2,057,373

UNITED STATES PATENT OFFICE 2,057,373

PORTABLE OVEN

Oscar W. Dukes, Brooklyn, N. Y.

Application December 19, 1934, Serial No. 758,232

3 Claims. (Cl. 126—275)

This invention relates to portable ovens. The primary object thereof is to construct a device of this character which is compact in form and economical in operation to afford the manual class of worker an opportunity of obtaining a cooked meal at a minimum of expense and effort. A further object is to provide an oven, to meet such individual requirements, which may be readily carried about by the user without inconvenience because of its size or weight.

Another object is to provide a means for adjusting the height of the flame utilized for cooking or warming the food in the oven inclosure without the necessity of opening the same and removing the contents thereof in order to accomplish this purpose.

Still a further object is to provide means whereby the self-contained heating unit may be ignited without removing the same from the oven. I also have made provision whereby the operator may easily observe the height of the flame in the portable oven.

With the foregoing and other objects in view, as will hereinafter appear in the detailed description of the drawings, the invention comprises the novel construction, combination and arrangement of parts, the preferred embodiment of which is illustrated in the accompanying drawings.

Referring to the drawings:

Fig. 1 is a front perspective view of the improved portable oven with the top, or cover, closed.

Fig. 2 is a rear perspective view of the oven as shown in Fig. 1, a portion of the rear and side wall being broken away in order to indicate the interior construction of the same.

Fig. 3 is a plan view of the oven with the top, or cover, in an open position.

Fig. 4 is a cross-sectional view of the oven taken on line 4—4, Fig. 1.

Fig. 5 is a detailed side elevation of the heating device in position upon the perforated oven base, and Fig. 6 is an enlarged perspective view of one of the cooking pans utilized in the oven.

The oven constructed to embody the herein disclosed inventive concepts, with reference particularly to Figs. 1 and 2, preferably comprises an external body, or casing, 10, the base of which is rectangular in form. This casing includes a front wall 11, rear wall 12, side walls 13 and 14, and interiorly raised base 15 defining the lower limit of the cooking compartment, and a cover 16. Centrally situated upon the exterior surface of the cover is a handle 17 by means of which the oven may be conveniently carried. The cover is further constructed to include front, rear and side walls, designated at 11', 12', and 13', 14' respectively, which are in contiguous association with the main walls of the oven body or casing and which form an extension thereof when the cover is situated in a closed position, said walls in association defining the cooking compartment of the oven. Hinges 17, or other suitable means are provided for movably connecting the cover 17 to the main body portion 10 of the oven. The rear wall 12' is constructed to include a means for limiting the movement of the cover with respect to the body of the oven, this means, as indicated in the drawings, being in the form of two lugs or extending pieces 18, the lower surfaces of which rest against the rear wall 12, to maintain the cover in an open position at an angle of slightly more than perpendicular to the oven body. At the front of the oven provision is made for a number of catches 19 for securing the cover tightly upon the main oven casing. A locking device 20 is also provided so that the contents of the oven may be protected against theft. The front wall 11 of the casing has a window 21 over which is located a movable shield plate 22. The rear wall 12 is provided in a similar manner with an opening 23 having a movable shield 24 thereover. About a perimeter of the oven, at a position below that of the interior raised base 15, there is situated a plurality of ventilating openings designated at 25. The side walls of the cover of the casing are also provided with a plurality of ventilating openings as indicated at 26.

With reference to Figs. 3 to 6, inclusive, the internal walls of the oven casing are lined with an asbestos board such as designated at 27. This heat insulating and fire protecting material is also employed to line the inner surface of the cover of the oven as indicated at 28. The base 15 for the oven is raised above its normal position therein for the purpose of supporting a heating device so that it will not protrude below the open bottom of the casing. The heating device for the oven takes the form of an alcohol burner 29, having the customary cylindrical retainer for the fuel as indicated at 30, and wick turning lever 31 with a cog wheel 32 at the end of the lever. The burner is movably supported by the base 15, the flange 33 of the burner resting upon the lip of a circular opening 34, Fig. 2, in the base, the cylindrical alcohol retainer 30 extending below the base in a position which is readily accessible to the user of the device. Catch mechanisms 35 are provided for securing the burner firmly in position in the base, yet permitting the burner to be removed from the oven for purposes of refilling the same with fuel. The base wall 15 is constructed to include a plurality of perforations or ventilating openings 36 therein to permit the passage of air through the device. A circularly arranged series of closely set perforations 37 are situated in the base which perforate openings mesh with, or receive the teeth of the cog wheel 32 of the alcohol burner 29. Through this arrangement of the burner, or heating device, in the base of the oven, the operator is afforded ready means of adjusting the height of the flame of the burner by rotating the fuel retainer 30 either clockwise or counter-clockwise as desired in order to move the lever 31 to cause the proper rotation thereof through the travel of the cog 32 over the perforations 37 to control the position of the wick.

Situated above the burner in the oven is a removable rack 38 upon which is rested the receptacles for the food. The lower of the receptacles, Fig. 4, contains water which is directly heated by the flame of the burner. A food receptacle 39, Fig. 6, fits snugly upon the water containing receptacle, the same being preferably divided into three separate food compartments by the partitions 40. The top receptacle fits over the receptacle 39 as indicated at 41, the bottom of the same resting upon the upper surface of the partitions 40. The receptacle 41 is relatively shallow and is constructed to include a number of perforations or openings in its base as designated at 42. The interfitting receptacles fit closely within the interior of the oven compartment defined by the asbestos walls in the casing 10, but permit the passage of air around the same, so that when the oven is in operation, a continuous flow of air through the device is facilitated, through means of openings 25, perforations 36 in the base of the oven compartment and openings 26 in the cover, as clearly shown by the arrows indicating the direction of the air current in Fig. 4. The opening 23 in the rear wall of the casing provides a means for igniting the wick of the burner, and the window 21 oppositely adjacent thereto in the front wall 11 enables the operator to view this procedure and thereafter to observe that the adjustment of the height of the flame of the burner in the oven compartment is made in a satisfactory manner.

While I have shown and described the preferred embodiment of my invention, I do not desire to limit myself to the specific forms illustrated, but may alter the construction and arrangement of parts as occasion requires without enlarging the scope of my invention or departing from the spirit thereof as contained in the appended claims.

I claim as my invention:

1. In a portable oven, a casing defining a cooking inclosure, said casing having an open bottom, an interiorly raised base defining the lower extremity of the cooking inclosure, an alcohol burner rotatably positioned upon the base, said burner having a fuel receptacle extending below the base, a wick turning lever on the burner having a cog wheel at its extremity, and a plurality of circularly arranged perforate openings in the base meshing with the teeth of the cog wheel, whereby the operator of the oven may adjust the height of the flame of the burner by rotating the accessible fuel receptacle of the same.

2. A portable oven comprising a casing having an open bottom and including an interiorly raised base forming a cooking inclosure, a burner rotatably mounted on the base, a fuel receptacle connected to said burner adapted to extend below the base, a flame adjusting means operatively associated with said burner, and means operative to actuate said adjusting means responsive to rotation of the burner by the portion thereof defining the fuel receptacle.

3. A portable cooking device comprising a casing having an open bottom and including an interiorly raised base forming a cooking inclosure, a burner rotatably mounted on and extending below said base, a flame adjusting means operatively associated with said burner, and means operative to actuate said adjusting means in response to rotation of the burner.

OSCAR W. DUKES.